United States Patent
Chakravarty et al.

(10) Patent No.: US 11,158,066 B2
(45) Date of Patent: Oct. 26, 2021

(54) BEARING ONLY SLAM WITH CAMERAS AS LANDMARKS

(71) Applicant: Ford Global Technologies, LLC, Dearborn, MI (US)

(72) Inventors: Punarjay Chakravarty, Campbell, CA (US); Gintaras Vincent Puskorius, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/751,412

(22) Filed: Jan. 24, 2020

(65) Prior Publication Data

US 2021/0233260 A1    Jul. 29, 2021

(51) Int. Cl.
| | |
|---|---|
| G06T 7/277 | (2017.01) |
| G01C 22/00 | (2006.01) |
| G06T 7/292 | (2017.01) |
| G06T 7/246 | (2017.01) |

(52) U.S. Cl.
CPC .............. *G06T 7/277* (2017.01); *G01C 22/00* (2013.01); *G06T 7/246* (2017.01); *G06T 7/292* (2017.01)

(58) Field of Classification Search
CPC ......... G06T 7/246; G06T 7/277; G06T 7/292; G01C 22/00
See application file for complete search history.

(56) References Cited

U.S. PATENT DOCUMENTS

| | | |
|---|---|---|
| 8,315,794 B1 | 11/2012 | Strelow et al. |
| 8,368,759 B2 | 2/2013 | Yoo et al. |
| 9,056,754 B2 | 6/2015 | Wong et al. |
| 9,250,081 B2 | 2/2016 | Gutmann et al. |
| 10,061,324 B2 | 8/2018 | Iimura et al. |
| 10,191,495 B2 | 1/2019 | Bobda |
| 2004/0168148 A1* | 8/2004 | Goncalves ........... G05D 1/0248 717/104 |
| 2009/0312871 A1 | 12/2009 | Lee et al. |
| 2012/0121161 A1* | 5/2012 | Eade ................... G05D 1/0253 382/153 |
| 2012/0281506 A1* | 11/2012 | Rikoski ............... G01S 7/52003 367/88 |

* cited by examiner

Primary Examiner — Myron Wyche
(74) Attorney, Agent, or Firm — Frank A. MacKenzie; Bejin Bieneman PLC

(57) ABSTRACT

A system comprises a computer including a processor and a memory, and the memory including instructions such that the processor is programmed to calculate, at a server, a distance between a fixed camera disposed within an environment and a vehicle traversing the environment based on at least two image frames captured by the fixed camera, wherein the at least two image frames depict the vehicle at different image coordinates; determine a position of the fixed camera based on the distance and vehicle distance measurements measured by a vehicle sensor; and generate a map representing the environment based on the position of the fixed camera and the vehicle distance measurements.

20 Claims, 7 Drawing Sheets

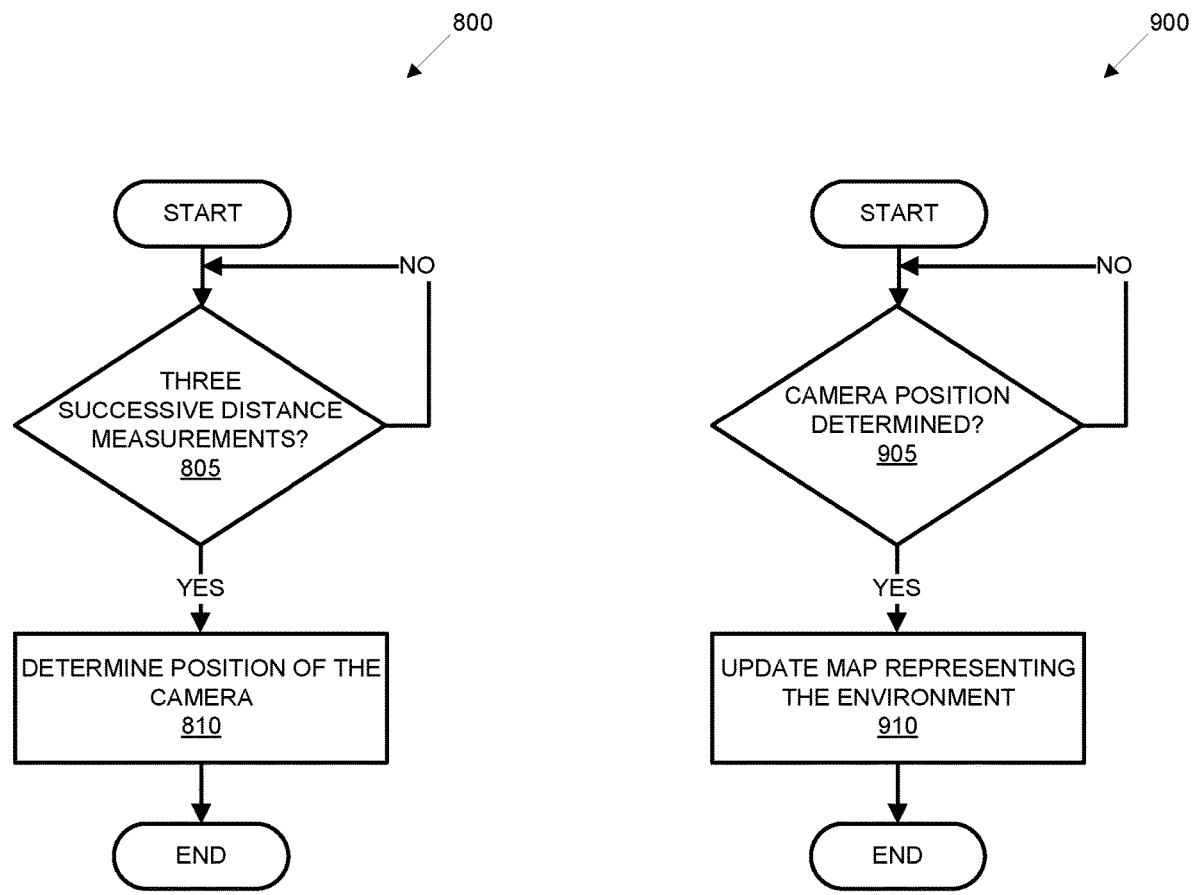
FIG. 8  FIG. 9

BEARING ONLY SLAM WITH CAMERAS AS LANDMARKS

BACKGROUND

Vehicles use sensors to collect data while operating, the sensors including odometers, radar, LIDAR, vision systems, infrared systems, and ultrasonic transducers. Vehicles can actuate the sensors to collect data while traveling along roadways. Based on the data, it is possible to determine parameters associated with the vehicle. For example, sensor data can be indicative of objects relative to the vehicle.

BRIEF DESCRIPTION OF THE DRAWINGS

FIG. 8 is a flow diagram illustrating an example process for determining a position of a fixed camera.

FIG. 9 is a flow diagram illustrating an example process for updating a map of an environment.

DETAILED DESCRIPTION

Figure 1:
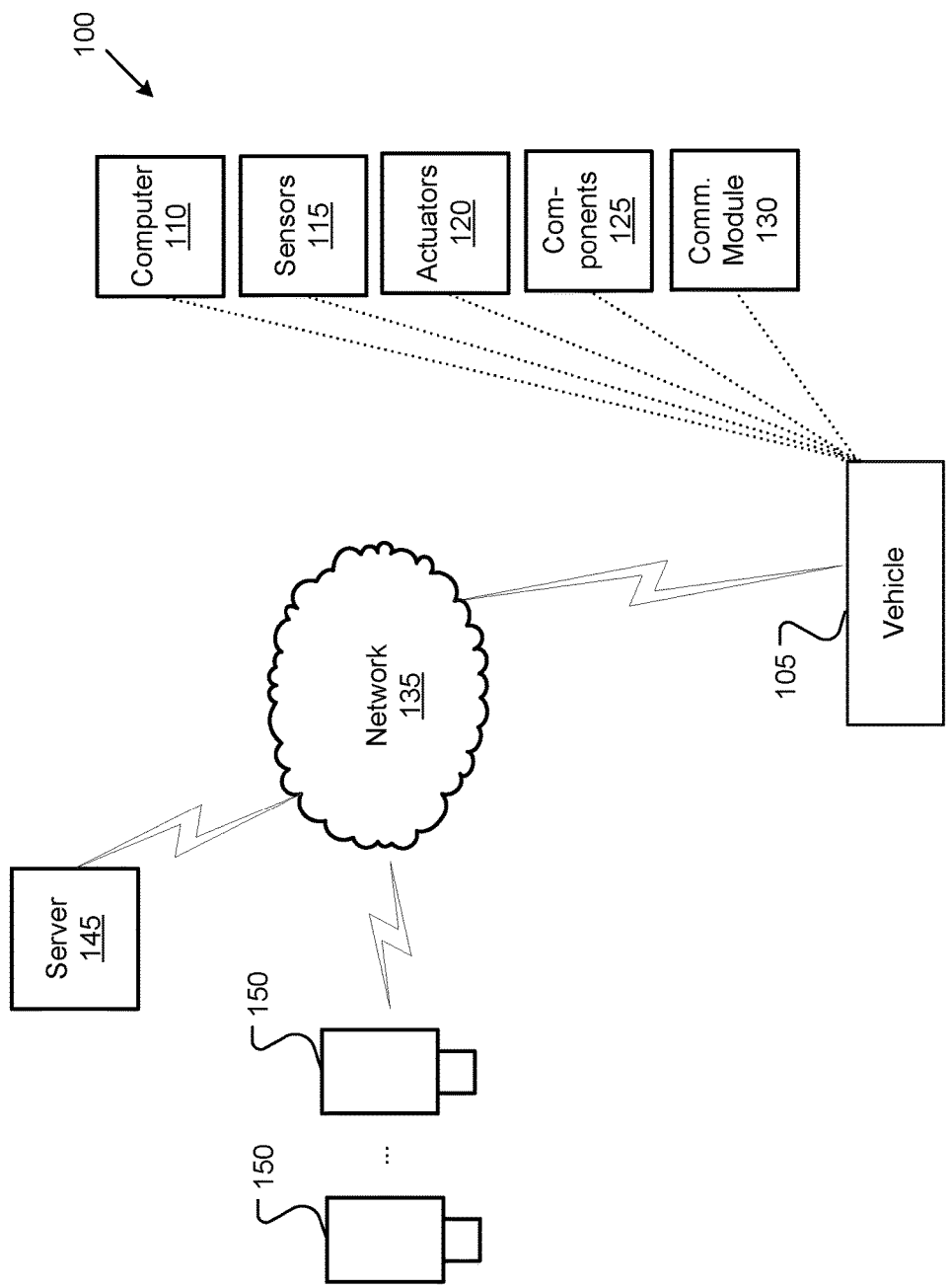
FIG. 1 is a diagram of an example system for generating and/or updating a map of an environment using external cameras.

The present disclosure describes one or more systems and methods that use Simultaneous Localization and Mapping (SLAM) techniques to generate and/or update a map. In one or more implementations, an environment includes one or more fixed external cameras that serve as landmarks within the detected environment. In some implementations, the cameras capture two-dimensional (2D) images of the environment. As a vehicle traverses the environment, the cameras capture images of the vehicle that can be transmitted to a server. The server may also receive vehicle distance measurements from the vehicle. For example, the vehicle distance measurements may be generated by a wheel odometer. Using the image data and the vehicle distance measurements, the server can generate and/or update a map of the environment. Additionally, the server can track, e.g., localize, the vehicle within the environment.

In other SLAM detection environments, there may be issues with data association. Additionally, in other SLAM detection environments, features in the environment—such as corners or lines are landmarks, and the detection of these features might be brittle. The present disclosure can mitigate data association issues. For example, since the external cameras can un-ambiguously detect vehicles within the monitored environment, and the vehicle can determine which camera the vehicle is identified within (due to network communications), data from vehicle and data from the cameras can be associated. Once the cameras are detected and established as landmarks within a map, the vehicle can be localized accurately within the map during subsequent passes within the environment.

A system comprises a computer including a processor and a memory, and the memory including instructions such that the processor is programmed to calculate, at a server, a distance between a fixed camera disposed within an environment and a vehicle traversing the environment based on at least two image frames captured by the fixed camera, wherein the at least two image frames depict the vehicle at different image coordinates; determine a position of the fixed camera based on the distance and vehicle distance measurements measured by a vehicle sensor; and generate a map representing the environment based on the position of the fixed camera and the vehicle distance measurements.

In other features, the at least two image frames comprise a first image frame depicting the vehicle at a first image coordinate and a second image frame depicting the vehicle at a second image coordinate.

In other features, the processor is further programmed to determine an angle based on the first image coordinate and the second image coordinate; and calculate the distance based on the angle and a distance traveled by the vehicle, wherein the distance traveled by the vehicle is based on the vehicle distance measurements.

In other features, the processor is further programmed to calculate a distance traveled by the vehicle by subtracting a first vehicle distance measurement corresponding to the first image coordinate from a second vehicle distance measurement corresponding to the second image coordinate.

In other features, the processor is further programmed to calculate the distance using small angle approximation.

In other features, the fixed camera comprises a two-dimensional (2D) camera.

In other features, the vehicle sensor comprises a wheel odometry sensor.

In other features, the wheel odometry sensor comprises an odometer.

In other features, the map is generated based on an Extended Kalman Filter.

In other features, the position of the fixed camera is determined based on three successive distance determinations and corresponding vehicle distance measurements.

A method comprises calculating, at a server, a distance between a fixed camera disposed within an environment and a vehicle traversing the environment based on at least two image frames captured by the fixed camera, wherein the at least two image frames depict the vehicle at different image coordinates; determining a position of the fixed camera based on the distance and vehicle distance measurements measured by a vehicle sensor; and generating a map representing the environment based on the position of the fixed camera and the vehicle distance measurements.

In other features, the at least two image frames comprise a first image frame depicting the vehicle at a first image coordinate and a second image frame depicting the vehicle at a second image coordinate.

In other features, the method comprises determining an angle based on the first image coordinate and the second image coordinate; and calculating the distance based on the angle and a distance traveled by the vehicle, wherein the distance traveled by the vehicle is based on the vehicle distance measurements.

In other features, the method includes calculating a distance traveled by the vehicle by subtracting a first vehicle distance measurement corresponding to the first image coordinate from a second vehicle distance measurement corresponding to the second image coordinate.

In other features, the method includes calculating the distance using small angle approximation.

In other features, the fixed camera comprises a two-dimensional (2D) camera.

In other features, the vehicle sensor comprises a wheel odometry sensor.

In other features, the wheel odometry sensor comprises an odometer.

In other features, the map is generated based on an Extended Kalman Filter.

In other features, the position of the fixed camera is determined based on three successive distance determinations and corresponding vehicle distance measurements.

FIG. 1 is a block diagram of an example environment 100. The environment 100 includes a vehicle 105, which is a land vehicle such as a car, truck, etc., an aerial vehicle, such as an unmanned aerial vehicle, or an aquatic vehicle. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects, etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 includes one or more mechanisms by which a computer 110 may communicate with a server 145. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

The server 145 can be a computing device, i.e., including one or more processors and one or more memories, programmed to provide operations such as disclosed herein. Further, the server 145 can be accessed via the network 135, e.g., the Internet or some other wide area network. The computer 110 can receive and analyze data from sensors 115 substantially continuously, periodically, and/or when instructed by a server 145, etc.

In some implementations, the vehicle 105 may include one or more sensors 115 that measures a distance traveled by the vehicle 105 and/or relative movement, e.g., angle, of the vehicle 105 with respect to the vehicle's 105 previous position. For example, the vehicle sensor 115 may be a rotatory encoder, a bearing sensor, a wheel odometry sensor, or the like.

As shown in FIG. 1, the environment 100 also includes one or more image capture devices 150. The image capture devices 150 may be attached to one or more structures positioned throughout the environment 100. The image capture devices 150 are configured to capture images within a field-of-view (FOV) of the respective image capture device 150. The image capture devices 150 may comprise cameras that capture one or more Red-Green-Blue image frames and/or two-dimensional (2D) image frames.

The server 145 can receive sensor 115 data from the vehicle 105 and image data representing images captured by the image capture device 150 via the network 135. Various techniques are described that may be used to interpret image data and/or sensor 115 data. For example, the image data can be provided to a classifier that comprises programming to utilize one or more image classification techniques. For example, the classifier can use a machine learning technique in which data known to represent various objects, is provided to a machine learning program for training the classifier. Once trained, the classifier can accept as input an image and then provide as output, for each of one or more respective regions of interest in the image, an indication of one or more objects, or an indication that no object is present in the respective region of interest. Further, a coordinate system (e.g., polar or cartesian) applied to an area proximate to a vehicle 105 can be applied to specify locations and/or areas (e.g., according to the image capture device 150 coordinate system, translated to global latitude and longitude geo-coordinates, etc.) of objects identified from the image data.

Figure 2:
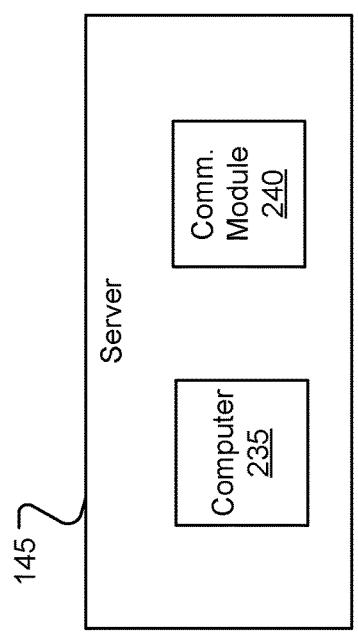
FIG. 2 is block diagram illustrating an example server.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3:
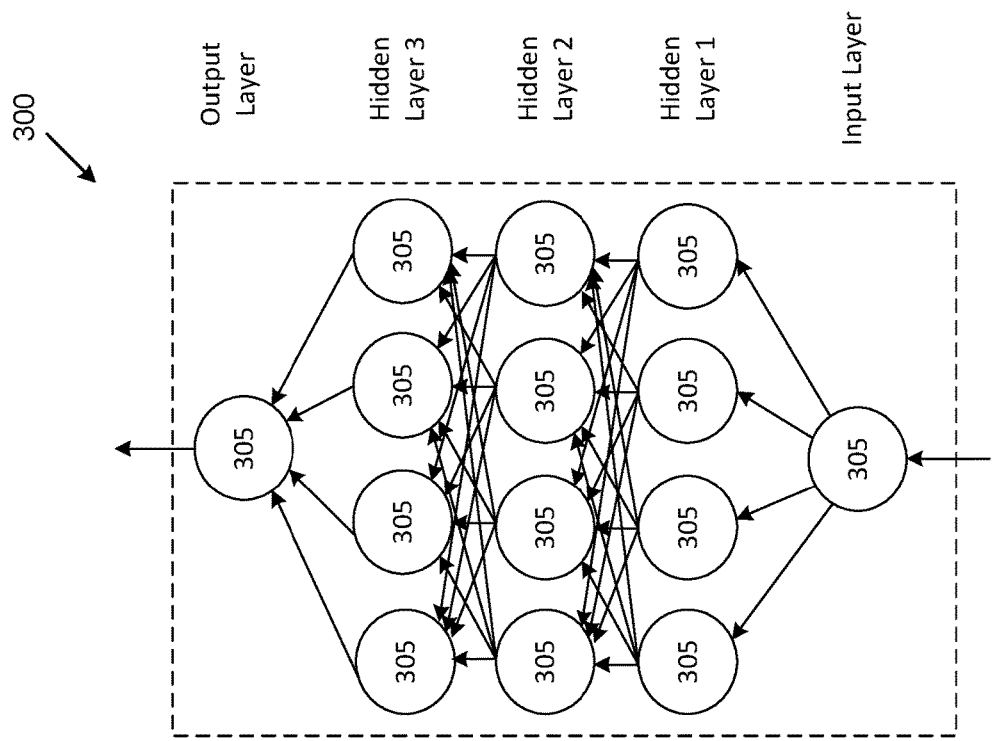
FIG. 3 is a diagram illustrating an example neural network.

FIG. 3 is diagram of an example deep neural network (DNN) 300. The DNN 300 can be a software program that can be loaded in memory and executed by a processor included in computer 235, for example. In an example implementation, the DNN 300 can include, but is not limited to, a convolutional neural network (CNN), R-CNN (regions with CNN features), Fast R-CNN, and Faster R-CNN. The DNN 200 includes multiple nodes 305, and the nodes 305 are arranged so that the DNN 300 includes an input layer, one or more hidden layers, and an output layer. Each layer of the DNN 300 can include a plurality of nodes 305. While FIG. 3 illustrates three (3) hidden layers, it is understood that the DNN 300 can include additional or fewer hidden layers. The input and output layers may also include more than one (1) node 305.

The nodes 305 are sometimes referred to as artificial neurons 305, because they are designed to emulate biological, e.g., human, neurons. A set of inputs (represented by the arrows) to each neuron 305 are each multiplied by respective weights. The weighted inputs can then be summed in an input function to provide, possibly adjusted by a bias, a net input. The net input can then be provided to activation function, which in turn provides a connected neuron 305 an output. The activation function can be a variety of suitable functions, typically selected based on empirical analysis. As illustrated by the arrows in FIG. 3, neuron 305 outputs can then be provided for inclusion in a set of inputs to one or more neurons 305 in a next layer.

The DNN 300 can be trained to accept image data as input and generate an indication that the vehicle 105 is detected within the FOV of one of the image capture devices. The DNN 300 can be trained with ground truth data, i.e., data about a real-world condition or state. For example, the DNN 300 can be trained with ground truth data or updated with additional data. Weights can be initialized by using a Gaussian distribution, for example, and a bias for each node 305 can be set to zero. Training the DNN 300 can including updating weights and biases via suitable techniques such as back-propagation with optimizations. Ground truth data can include, but is not limited to, data specifying objects within an image or data specifying a physical parameter, e.g., angle, speed, distance, or angle of object relative to another object. For example, the ground truth data may be data representing and objects and object labels. In another example, the ground truth data may be data representing object and a relative angle of the object with respect to another object.

The server 145 is configured to localize and build a map indicative of the environment 100. As described in greater detail herein, the server 145 receives sensor 115 data from the vehicle 105 and image data from one or more image capture devices 150. In some implementations, the vehicle 105 may only employ one or more sensors 115 that measure a distance traveled by the vehicle 105.

The server 145 is configured to detect the presence of the vehicle 105 using the image data. In one example, the server 145 may employ suitable background subtraction techniques to determine the presence of the absence of the vehicle 105 within a FOV of one of the image capture devices 150. In another example, the server 145 may employ suitable detection and classification techniques using the DNN 300 to determine the presence of the absence of the vehicle 105 within a FOV of one of the image capture devices 150.

Figure 4:
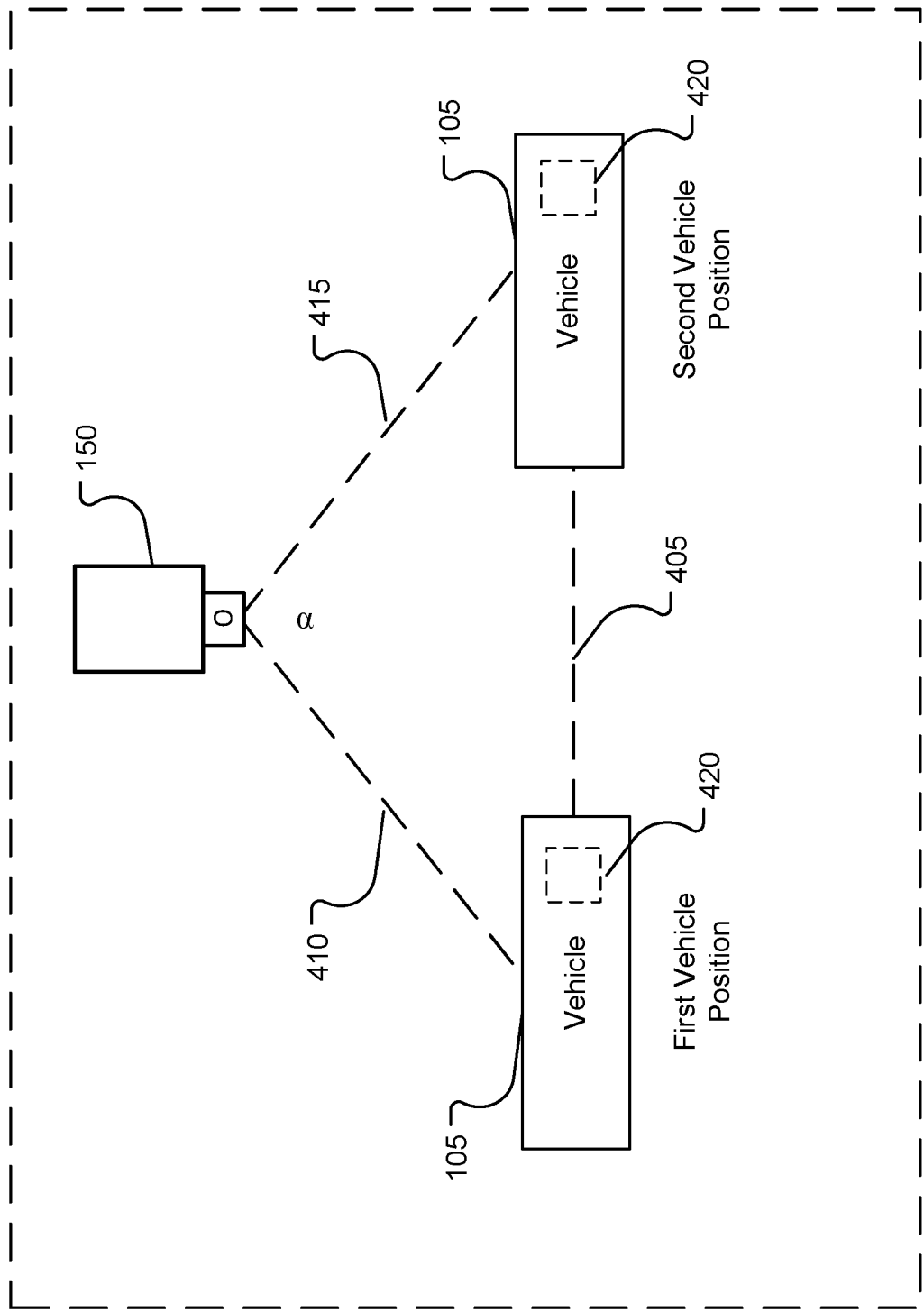
FIG. 4 is a diagram illustrating an example vehicle traversing an environment.

FIG. 4 illustrates the vehicle 105 within the environment 100. Within the present context, the vehicle 105 travels from a first vehicle position ("First Vehicle Position") to a second vehicle position ("Second Vehicle Position"). The camera 150 captures an image of the vehicle 105 at the first vehicle position and at the second vehicle position. The distance traveled by the vehicle 105 is measured by the sensor 115, which is referred to as distance 405. The vehicle 105 sensor 115 can measure the distance traveled. The sensor 115 data representing distance measurements and the image data is transmitted to the server 145 for further processing. The computer 235 can associate detected vehicle 105 positions with distance measurements. In an example implementation, the computer 235 can associate detected vehicle positions with the corresponding distance measurements using time stamp data obtained from the image data and the distance data.

As shown, each vehicle 105 position is associated with a corresponding ray 410, 415 that extends from an optical origin "O" of the camera 150 with an angle a therebetween. The optical origin "O" may correspond to a specified pixel of the camera 150. Within the present context, the angle a represents an apex angle of a triangle in which the rays 410, 415 form the sides of the triangle and the distance traveled 305 forms the base of the triangle. The rays 410, 415 extend from the camera 150 to the vehicle 105.

The computer 235 can determine the angle a based on the image coordinates of the image capture device 150. For instance, the computer 235 can calculate the angle a based on the image coordinates corresponding to the vehicle 105 at the first vehicle position and the image coordinates of the vehicle 105 at the second vehicle position. The computer 235 can also determine the distance traveled 305 based on a first distance measurement corresponding to the first vehicle position and a second distance measurement corresponding to the second vehicle position. The distance traveled may be calculated by subtracting the second distance measurement from the first distance measurement.

Using the distance traveled 305 and the angle a, the computer 235 can calculate the length of ray 415 using suitable triangle side length calculations. It is understood that other ray lengths may be calculated in accordance with the present disclosure. In an example implementation, the computer 235 can calculate the distance of ray 415 using small angle approximation, which is defined as:

$$\alpha \text{ (in radians)} = \text{(distance traveled)}/\text{(length of the ray)}, \quad \text{Eq. 1.}$$

Thus, the length of ray 415 may be determined by dividing the distance traveled 305 by the angle a (in radians). In some implementations, the computer 235 is configured to convert the angle a between degrees and radians. As described in greater detail below, the length of ray 415 may represent a radius of a circle around the vehicle 105.

In some implementations, a calibration code 420 may be disposed on the vehicle 105, such as a roof of the vehicle 105. The computer 235 may use the calibration code 420 to calculate the distance and/or a bearing (direction) of the vehicle 105 relative to the camera 150. For example, the computer 235 may store dimensions of the of the calibration code 420. Based on the received image data, the computer 235 determines how many pixels within the image frame correspond to the calibration code 420 and compare the number of pixels to the dimensions. Additionally or alternately, the computer 235 can compute the six (6) degrees of freedom pose based on the calibration code 420 portions captured by the camera 150.

Figure 5:
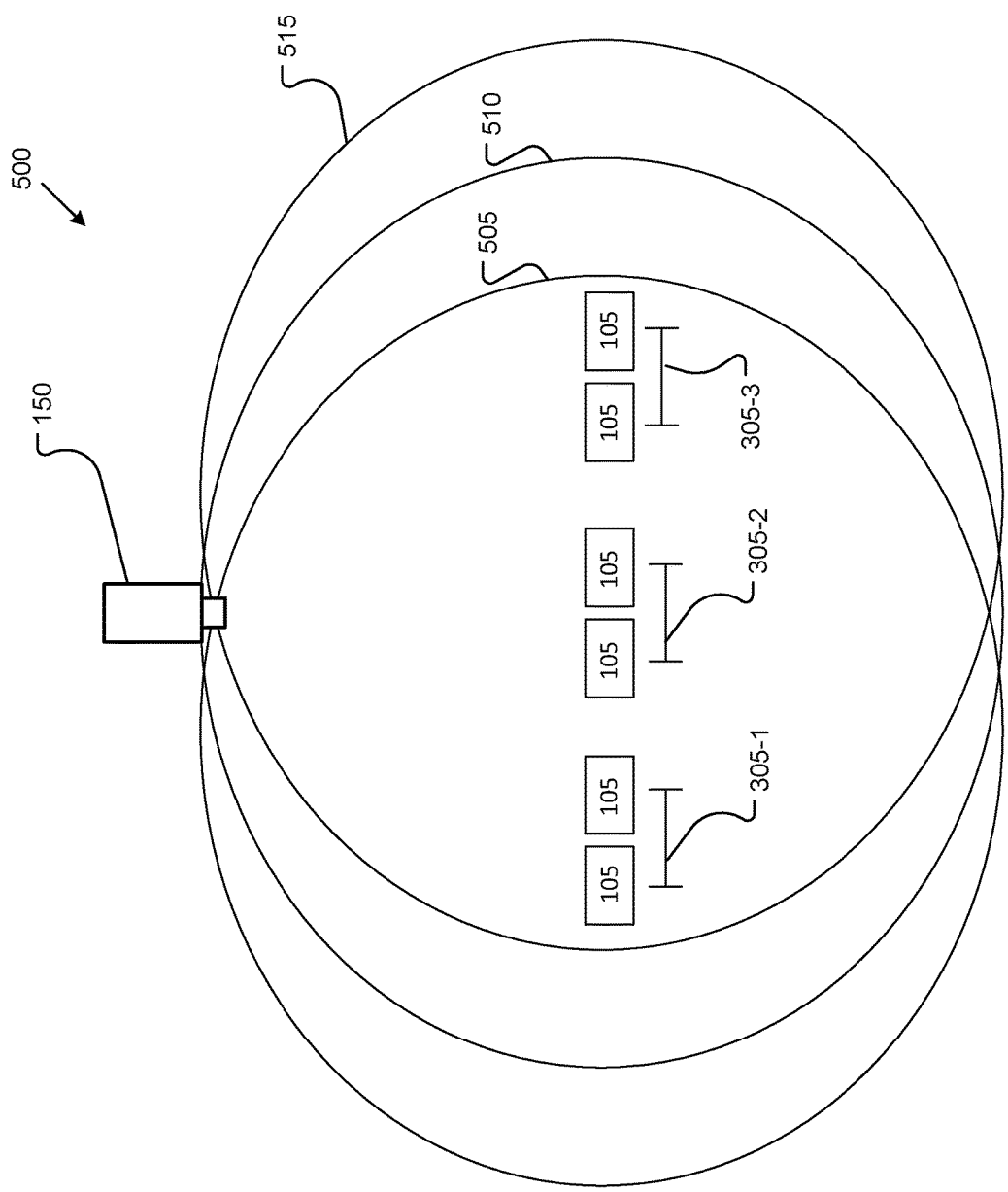
FIG. 5 is another diagram illustrating an example vehicle traversing an environment.

FIG. 5 illustrates an environment 500 three (3) different circles 505, 510, 515 representing three (3) different successive distance measurement calculations by the computer 235. The computer 235 calculated the three different measurements based on at least three different images captured by the image capture device 150 and the distance traveled by the vehicle 105. As described above, the computer 235 can associate distance data provided by the vehicle 105 sensor 115 with image data based on timestamps corresponding to the respective data. Within this context, the circle 505 corresponds to the distance traveled 305-1 by the vehicle 105 during a first time interval, the circle 510 corresponds to the distance traveled 305-2 by the vehicle 105 during a second time interval, and the circle 515 corresponds to the distance traveled 305-3 by the vehicle 105 during a third time interval.

Using the three successive distance measurement calculations, the computer 235 can determine the relative camera 105 position and bearing (direction) of the vehicle 105 through suitable trilateration techniques. Once the position, e.g., location, of the camera 150 is determined, the computer 235 sets the camera 150 as a landmark within the environment 500.

Figure 6:
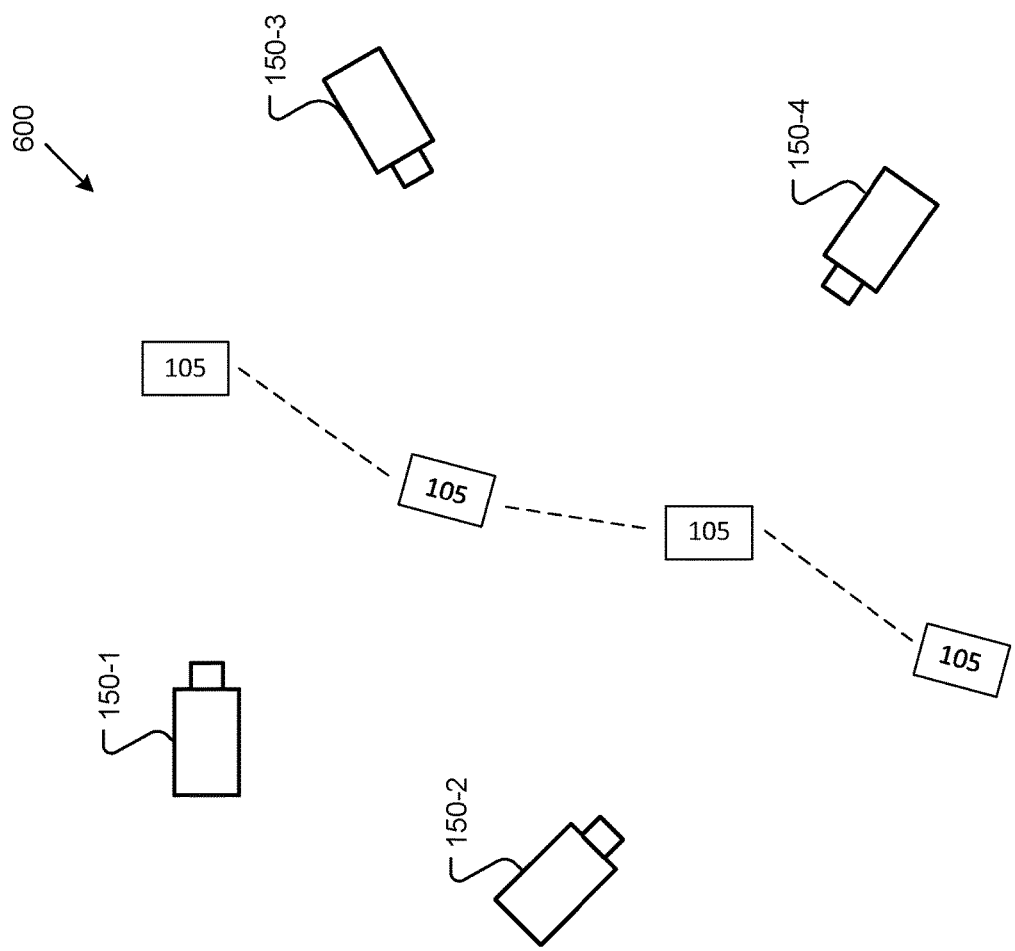
FIG. 6 is another diagram illustrating an example vehicle traversing an environment.

FIG. 6 illustrates an environment 600 including four (4) cameras 150-1, 150-2, 150-3, and 150-4. In an example implementation, the vehicle 105 travels through the environment 600 along a path 605, and each camera 150-1 through 150-4 captures at least three different images including the vehicle 105. For example, each 150-1, 150-2, 150-3, and 150-4 can use the triangulation techniques described above to determine a relative location of the respective camera 150-1, 150-2, 150-3, and 150-4 within the environment. As discussed above, the computer 235 can use the image data transmitted from the cameras 150-1 through 150-4 and vehicle 105 distance data transmitted from the vehicle 105 to estimate a relative distance of the vehicle 105 to respective cameras 105-1 through 150-4.

The computer 235 can generate or update an environment map based on the determined camera 150 positions and the vehicle 105 distance data. For example, the computer 235 may use Extended Kalman Filter (EKF) techniques, e.g., EKF-SLAM techniques, EKF-SLAM algorithms, to generate or update the environment map and/or positions of the vehicle 105 within the environment map. In an example implementation, the computer 235 applies EKF-SLAM techniques to the vehicle 105 distance data and the identified landmark position. Using the EKF-SLAM techniques, the computer 235 can continually receive new landmark data and new vehicle 105 distance data to update the environment map. For example, using EKF-SLAM, the computer 235 can add additional landmarks to the generated map and localize the vehicle 105 within the map.

Figure 7:
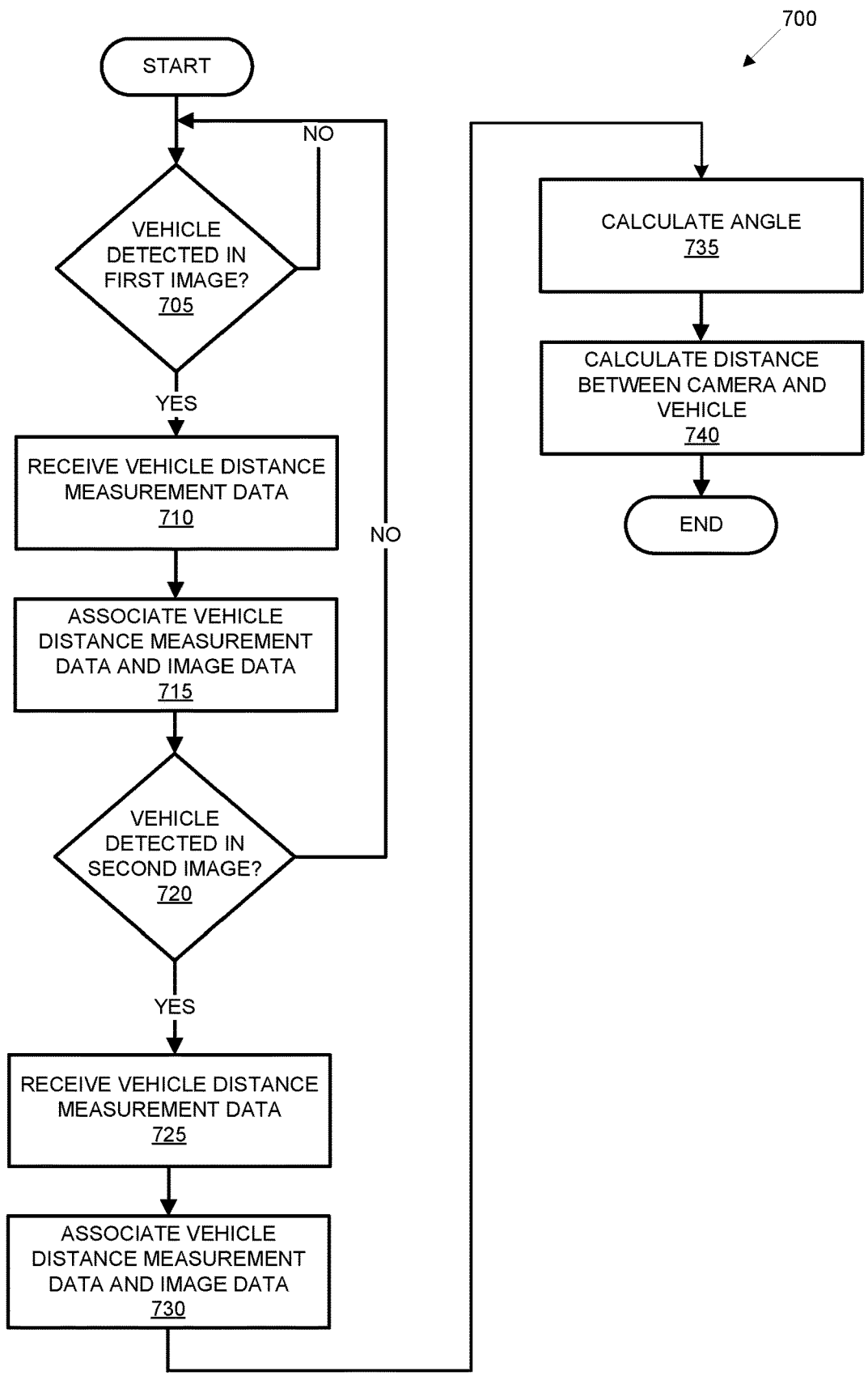
FIG. 7 is a flow diagram illustrating an example process for determining a relative distance between a fixed camera within an environment and a vehicle.

FIG. 7 is a flowchart of an exemplary process 700 for determining a distance between a camera 150 and the vehicle 105. Blocks of the process 700 can be executed by the computer 235. The process 700 begins at block 705 in which a determination is made whether the vehicle 105 is detected within a first image captured by the camera 150. In an example implementation, the vehicle 105 can be detected via the DNN 300. For example, using the images provided by the camera 150, the DNN 300 detects the vehicle 105 when the vehicle 105 enters the FOV of the camera 150. In another implementation, the vehicle 105 can be detected through suitable image subtraction techniques. If the vehicle 105 is not detected within the first image, the process 700 returns to block 705.

Otherwise, at block 710, data indicative of first vehicle distance measurement is received. At block 715, the initial vehicle distance measurement data is associated with the first image. At block 720, a determination is made whether the vehicle 105 is detected in a second image captured by the camera 150. If the vehicle 105 is not detected, the process 700 returns to block 705. If the vehicle 105 is detected, data indicative of a second vehicle distance measurement is received at block 725. At block 730, the second vehicle distance measurement data is associated with the second image. At block 735, an angle is determined. In an example implementation, the angle is calculated by the computer 235 using the image coordinates corresponding to the vehicle 105 detected in the first and the second images. For example, the computer 235 uses the coordinates of the pixels corresponding to the vehicle 105 to calculate an angle between the rays 410, 415. The computer 235 may also use image calibration parameters to calculate the angle.

At block 740, a distance between the camera 150 and the vehicle 105 is determined. In an example implementation, the distance between the camera 150 and the vehicle 105 is calculated by the computer 235 using suitable triangle calculation techniques. For instance, as described above, the rays 305, 410 represent two sides of a triangle, and the distance traveled by the vehicle 105 represents the base of the triangle. In this context, the distance between the camera 150 and the vehicle 105 corresponds to the ray 410 extending between the camera 150 and the vehicle 105. The computer 235 can calculate distance based on the known base, which corresponds to the distance traveled by the vehicle 105 between the ray 305 and the ray 410. The distance traveled by the vehicle 105 can be determined based upon the first and second vehicle distance measurements transmitted by the vehicle 105.

FIG. 8 is a flowchart of an exemplary process 800 for determining a position of the camera 150 relative to a vehicle 105. Blocks of the process 800 can be executed by the computer 235. The process 800 begins at block 805 in which a determination is made whether three successive distance measurements have been calculated for a camera 150. The three successive distance measurements can be calculated according to process 700 as described above and illustrated in FIG. 7. If the computer 235 has not calculated three successive distance measurements, the process 800 returns to block 805. Otherwise, at block 810, the computer 235 determines a position of the camera based on the three successive distance measurements. For example, the computer 235 can use suitable trilateration techniques to determine the camera 150 position. Once determined, the camera 150 can be identified as a landmark.

FIG. 9 is a flowchart of an exemplary process 900 for mapping camera 150 positions and/or tracking vehicle 105 positions. Blocks of the process 900 can be executed by the computer 235. The process 900 begins at block 905 in which a determination is made whether a camera 150 position has been determined. The camera 150 position can be determined according to process 800 as described above and illustrated in FIG. 8. If a camera 150 position has not been determined, the process 900 returns to block 905. Otherwise, at block 910, the computer 235 updates a map representing the environment. In an example implementation, the computer 235 updates the map with additional landmarks and/or localizes the vehicle 105 within the map using the camera 150 position and the vehicle 105 distance measurements. For example, the computer 235 can pass the camera 150 position and the vehicle 105 distance measurements to the EKF-SLAM algorithm. Using the EKF-SLAM algorithm, the computer 235 can update the map with additional landmarks and/or localize the vehicle 105 within the map upon receiving additional data.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   calculate, at a server, a distance between a stationary camera disposed within an environment and a vehicle traversing the environment based on at least two image frames captured by the stationary camera, wherein the at least two image frames depict the vehicle at different image coordinates;
   determine a position of the stationary camera based on the distance and vehicle distance measurements measured by a vehicle sensor; and
   generate a map representing the environment based on the position of the stationary camera and the vehicle distance measurements.

2. The system of claim 1, wherein the at least two image frames comprise a first image frame depicting the vehicle at a first image coordinate and a second image frame depicting the vehicle at a second image coordinate.

3. The system of claim 2, wherein the processor is further programmed to:
   determine an angle based on the first image coordinate and the second image coordinate; and
   calculate the distance based on the angle and a distance traveled by the vehicle, wherein the distance traveled by the vehicle is based on the vehicle distance measurements.

4. The system of claim 3, wherein the processor is further programmed to:
   calculate a distance traveled by the vehicle by subtracting a first vehicle distance measurement corresponding to the first image coordinate from a second vehicle distance measurement corresponding to the second image coordinate.

5. The system of claim 3, wherein the processor is further programmed to calculate the distance using small angle approximation.

6. The system of claim 1, wherein the stationary camera comprises a two-dimensional (2D) camera.

7. The system of claim 1, wherein the vehicle sensor comprises a wheel odometry sensor.

8. The system of claim 7, wherein the wheel odometry sensor comprises an odometer.

9. The system of claim 1, wherein the map is generated based on an Extended Kalman Filter.

10. The system of claim 1, wherein the position of the stationary camera is determined based on three successive distance determinations and corresponding vehicle distance measurements.

11. A method comprising:
    calculating, at a server, a distance between a stationary camera disposed within an environment and a vehicle traversing the environment based on at least two image frames captured by the stationary camera, wherein the at least two image frames depict the vehicle at different image coordinates;
    determining a position of the stationary camera based on the distance and vehicle distance measurements measured by a vehicle sensor; and
    generating a map representing the environment based on the position of the fixed stationary camera and the vehicle distance measurements.

12. The method of claim 11, wherein the at least two image frames comprise a first image frame depicting the vehicle at a first image coordinate and a second image frame depicting the vehicle at a second image coordinate.

13. The method of claim 12, further comprising:
    determining an angle based on the first image coordinate and the second image coordinate; and
    calculating the distance based on the angle and a distance traveled by the vehicle, wherein the distance traveled by the vehicle is based on the vehicle distance measurements.

14. The method of claim 13, further comprising:
    calculating a distance traveled by the vehicle by subtracting a first vehicle distance measurement corresponding to the first image coordinate from a second vehicle distance measurement corresponding to the second image coordinate.

15. The method of claim 13, further comprising calculating the distance using small angle approximation.

16. The method of claim 11, wherein the fixed stationary camera comprises a two-dimensional (2D) camera.

17. The method of claim 11, wherein the vehicle sensor comprises a wheel odometry sensor.

18. The method of claim 17, wherein the wheel odometry sensor comprises an odometer.

19. The method of claim 11, wherein the map is generated based on an Extended Kalman Filter.

20. The method of claim 11, wherein the position of the stationary camera is determined based on three successive distance determinations and corresponding vehicle distance measurements.

\* \* \* \* \*